United States Patent
Cleveland

(10) Patent No.: US 10,021,730 B2
(45) Date of Patent: Jul. 10, 2018

(54) SYSTEM AND METHOD FOR ACCESSING BROADBAND CONNECTIVITY OVER LOCAL WIRELESS NETWORK

(71) Applicant: Adtran, Inc., Huntsville, AL (US)

(72) Inventor: Paul Ancle Cleveland, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 141 days.

(21) Appl. No.: 15/062,653

(22) Filed: Mar. 7, 2016

(65) Prior Publication Data

US 2017/0257894 A1    Sep. 7, 2017

(51) Int. Cl.
| | |
|---|---|
| *H04W 76/10* | (2018.01) |
| *H04W 24/02* | (2009.01) |
| *H04W 40/00* | (2009.01) |
| *H04W 88/04* | (2009.01) |

(52) U.S. Cl.
CPC ........... *H04W 76/10* (2018.02); *H04W 24/02* (2013.01); *H04W 40/00* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 2002/0028655 A1* | 3/2002 | Rosener | ............... | H04B 7/2606 455/16 |
| 2003/0104781 A1* | 6/2003 | Son | ................... | H04B 7/15514 455/22 |
| 2008/0132164 A1* | 6/2008 | Bugenhagen | ........ | H04B 7/2606 455/11.1 |
| 2008/0220813 A1* | 9/2008 | Brown | ................ | H04L 12/5692 455/552.1 |
| 2009/0117899 A1* | 5/2009 | Shiff | .................... | H04B 7/2606 455/436 |
| 2010/0291949 A1* | 11/2010 | Shapira | ................... | G01S 19/48 455/456.1 |

* cited by examiner

*Primary Examiner* — Hassan Phillips
*Assistant Examiner* — Gautam Sharma
(74) *Attorney, Agent, or Firm* — Smith Tempel Blaha LLC; Michael J. Tempel

(57) ABSTRACT

A system for broadband communication over a local wireless communication channel includes a router configured to wirelessly access a wireless communication network, and a wireless broadband access device having wireless access to a wireless broadband communication network, the wireless broadband access device configured to wirelessly access the wireless communication network and configured to provide a bi-directional wireless communication channel to the router using the wireless communication network.

11 Claims, 7 Drawing Sheets

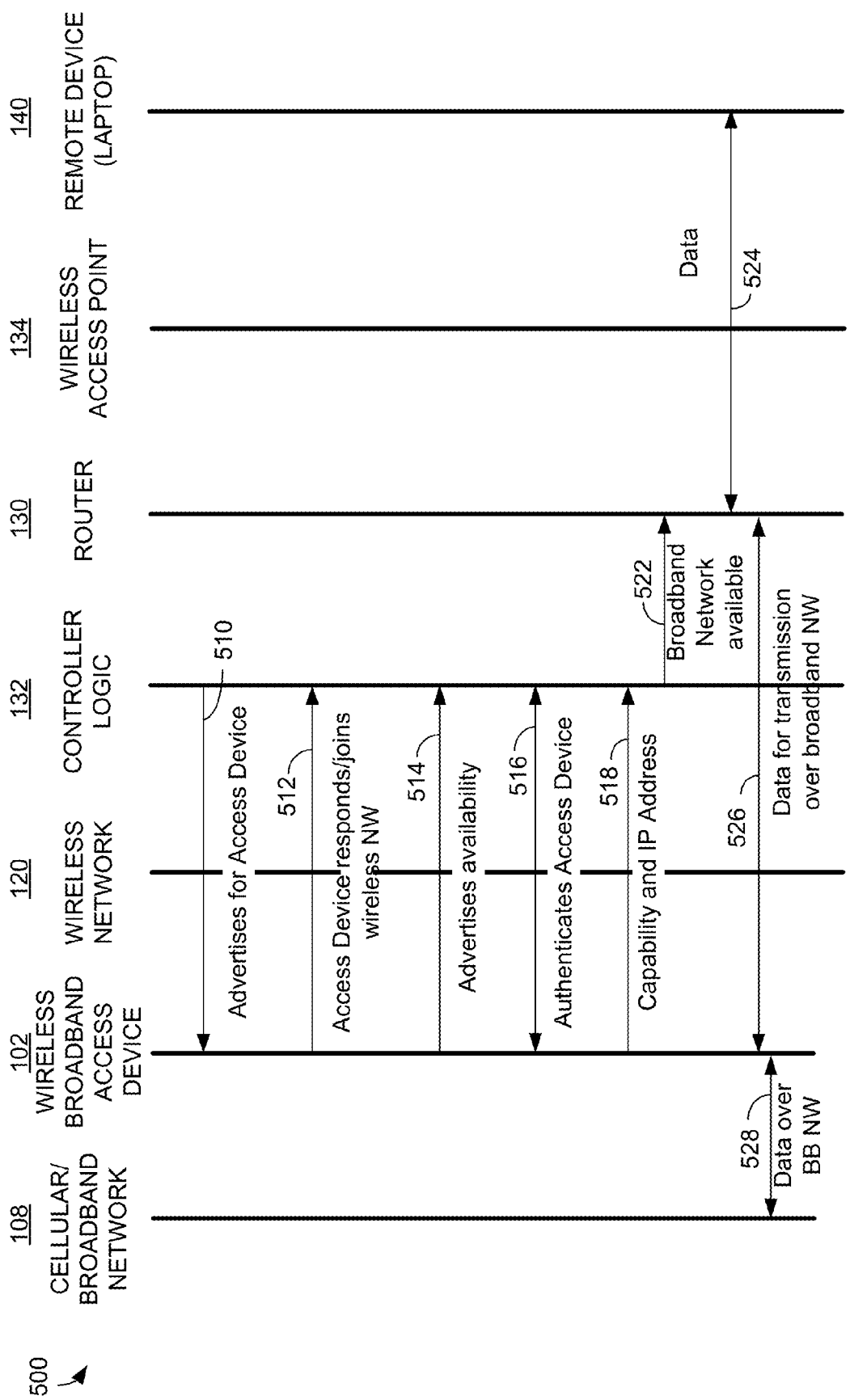

SYSTEM AND METHOD FOR ACCESSING BROADBAND CONNECTIVITY OVER LOCAL WIRELESS NETWORK

FIELD

The present disclosure relates generally to wireless communication. More specifically, the disclosure is directed to accessing broadband connectivity over a local wireless network.

DESCRIPTION OF THE RELATED ART

Many residential and commercial applications provide wireless connectivity and access to wireless networks. For example, many commercial locations provide their patrons wireless access to the Internet and typically provide a wireless local area network (WLAN) that may include one or more of a wireless router, a wired router, a wireless access point, or other components configured to provide wireless connectivity to the Internet. A wireless router for example, may also include wired LAN capability, and may typically also provide a gateway or other access to a wide area network (WAN), such as, for example, a broadband network. An example of a broadband network may be a wired network, such as one provided over a physical cable (e.g., a digital subscriber line (DSL) network, a cable network, and the like), or a wireless broadband network, such as a cellular broadband network, like a 4G, an LTE, or other wireless broadband network. If a router does not include an internal wireless communication platform, it may nevertheless provide LAN wireless access using a wireless access point (WAP).

A small wired and/or wireless network, such as one that may be deployed in a retail location such as, for example only, a retail store, a restaurant, a coffee house, or the like, typically deploys a router at the network edge to provide Internet access. A router that uses cellular connectivity (e.g. 4G or LTE) to access a broadband WAN, via, for example, an integrated or external universal serial bus (USB) cellular modem or the like, sometimes encounters conditions (such as wireless coverage, shielding, directionality, etc.) that result in poor cellular signal reception at the location of the router such that overall performance in accessing and communicating with the broadband WAN suffers greatly. In these situations, placement of the cellular antenna associated with the router ultimately determines the success of the wireless service deployment. Unfortunately, because the cellular antenna is typically located within the router, many times placing the cellular antenna in a location to ensure optimum cellular coverage means placing the router in an undesirable (e.g. non-secure) location from the end user perspective (e.g. in the customer area of a coffee shop) rather than a more desirable location, such as a wiring closet in a portion of the premises available only to employees.

Therefore, it would be desirable to have the ability to provide robust cellular service to a router, without unduly limiting the placement location of the router.

SUMMARY

One aspect of the disclosure provides a system for broadband communication over a local wireless communication channel including a router configured to wirelessly access a wireless communication network, and a wireless broadband access device having wireless access to a wireless broadband communication network, the wireless broadband access device configured to wirelessly access the wireless communication network and configured to provide a bi-directional wireless communication channel to the router using the wireless communication network.

Another aspect of the disclosure provides a method for communication including establishing a local wireless communication channel between a router and a wireless broadband access device, and using the local wireless communication channel to access a wireless broadband communication network to provide a bi-directional wireless communication channel to the router.

Another aspect of the disclosure provides a device including means for establishing a local wireless communication channel between a router and a wireless broadband access device, and means for using the local wireless communication channel to access a wireless broadband communication network to provide a bi-directional wireless communication channel to the router.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

Exemplary embodiments of the invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

FIG. 5 is a call flow diagram illustrating the communication between and among the elements of FIG. 1.

DETAILED DESCRIPTION

The present disclosure generally pertains to communication systems. In an exemplary embodiment, a communication system establishes a bi-directional wireless communication link between a router and a wireless broadband access device. The wireless broadband access device may provide access to a wireless broadband WAN, such as, for example, a cellular broadband network, such that the bi-directional wireless communication link between the router and the wireless broadband access device allows a remote device that is wirelessly connected to the router, access to the wireless broadband WAN via the wireless broadband access device.

Definitions:

LAN: a local area network (such as an Ethernet network) established by a device such as a router. A LAN may be a wired LAN or a wireless LAN (WLAN).

WAN: a wide area network (such as a wired or wireless broadband network) established by a device such as a router or another communication device. A WAN may be a wired WAN or a wireless WAN (WWAN).

Wireless broadband access device: a device that can establish a wired or wireless broadband connection to a wired WAN or a wireless WAN; and that can establish a wireless LAN connection to a router, a wireless access point (WAP), or another device.

Router: a device that can allow communication between a remote device (such as a smartphone, a laptop computer, a netbook computer, and the like) and a LAN and/or a WAN.

WAP: wireless access point.

Figure 1:
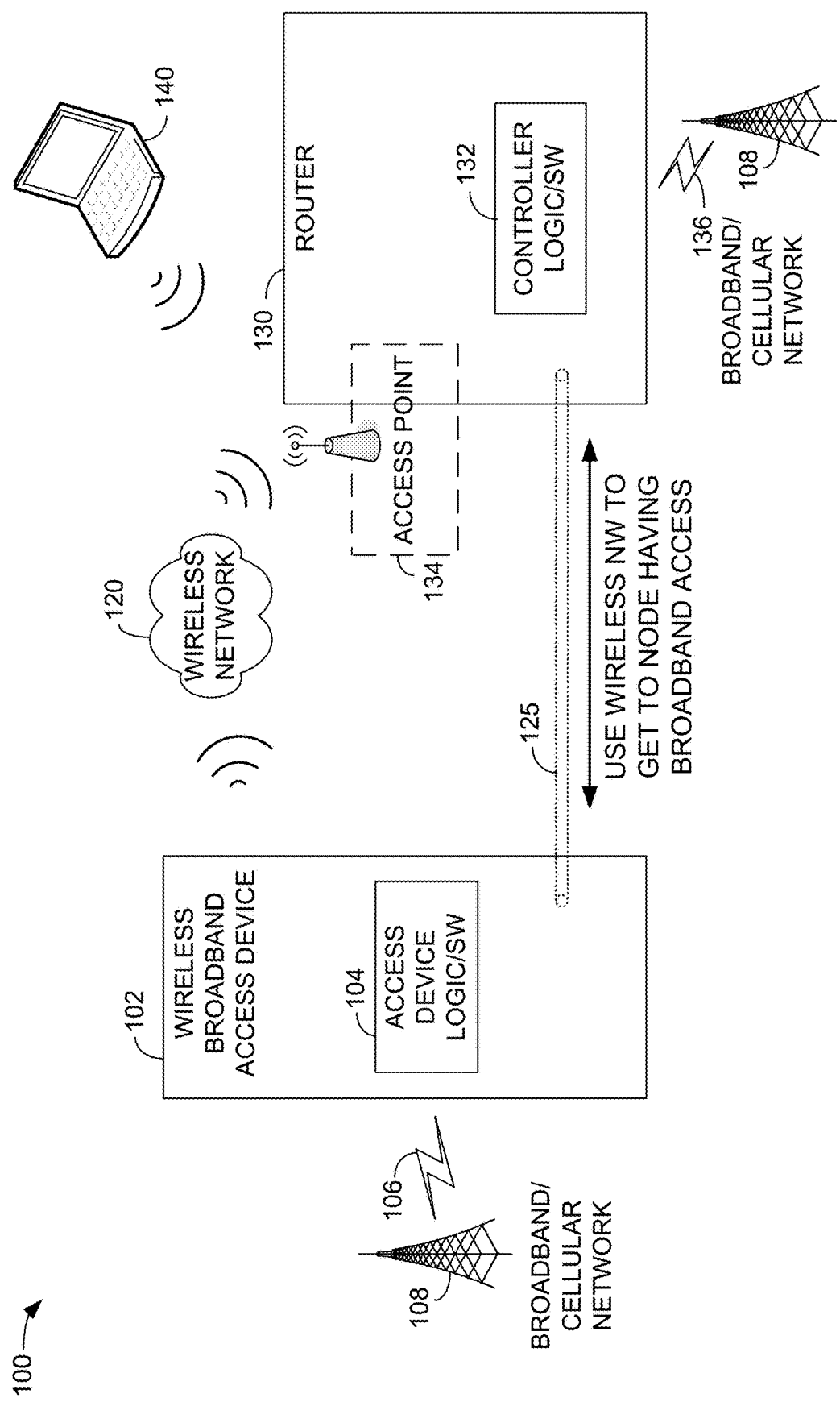
FIG. 1 is a block diagram illustrating an exemplary embodiment of a communication system.

FIG. 1 shows an exemplary embodiment of a communication system 100. The system 100 comprises a wireless broadband access device 102 and a router 130 that may communicate wirelessly over a wireless network 120. The wireless broadband access device 102 may also be referred to herein as an "access device."

The wireless broadband access device 102 comprises access device logic/software 104. The access device logic/software 104 may comprise hardware, firmware and/or software that allows the wireless broadband access device 102 to establish a bi-directional wireless connection, shown as a wireless communication channel 125, with the router 130, or with another device. The wireless broadband access device 102 also comprises functionality that allows the establishment of a bi-directional wireless communication channel 106 with a broadband/cellular network 108. The broadband/cellular network 108 may comprise, for example, a 4G an LTE, or another cellular network, and the bi-directional wireless communication channel 106 may comprise a 4G or LTE, or other wireless communication channel.

The router 130 comprises controller logic/software 132. The controller logic/software 132 may comprise hardware, firmware and/or software that allows the router 130 to establish a bi-directional wireless connection, shown as a wireless communication channel 125, with the wireless broadband access device 102. In an exemplary embodiment, the router 130 may comprise a built-in wireless access point 134. Alternatively, the router 130 may not include a wireless access point, and the wireless access point (WAP) 134 may be a discrete device or element with which the router 130 may communicate to access the wireless network 120. The wireless access point 134 is shown in FIG. 1 in dotted line to indicate that it may be located either inside of or remote from the router 130.

In some implementations, the router 130 may also comprise functionality that allows a bi-directional wireless communication channel 136 with the broadband/cellular network 108. The bi-directional wireless communication channel 136 may comprise a 4G or LTE, or other wireless communication channel, similar to the bi-directional wireless communication channel 106. However, as mentioned above, the placement of the router 130 may present difficulties when attempting to communicate over the bi-directional wireless communication channel 136 such that access to the broadband/cellular network 108 over the bi-directional wireless communication channel 136 may be unreliable or unstable.

The wireless broadband access device 102 and the router 130 may communicate over a wireless network 120. In an exemplary embodiment, the wireless network 120 may comprise a wireless local area network such as, for example, a WiFi network compliant with one or more of the IEEE 802.11 series of standards, a Bluetooth network, or any other wireless local area network.

In an exemplary embodiment, a remote device 140, such as a laptop computer, a smartphone, or another wireless enabled device, may communicate with the router 130 over the wireless network 120. Although only one remote device 140 is shown in FIG. 1, it is assumed that many remote devices may communication with the router over the wireless network 120.

In an exemplary embodiment, there are situations in which the router 130 may have poor wireless access to the broadband/cellular network 108 over the bi-directional wireless communication channel 136, such as, for example, if the router 130 is located in a location that limits the connectivity of the bi-directional wireless communication channel 136. However, the wireless broadband access device 102 may be located away from the router 130 in a location that allows the wireless broadband access device 102 to have a robust wireless connection to the broadband/cellular network 108 over the bi-directional wireless communication channel 106. In such a situation, the router 130 and the wireless broadband access device 102 may use the wireless network 120 to establish the wireless communication channel 125 to allow a bi-directional wireless connection between the router 130 and the wireless broadband access device 102. In an exemplary embodiment, the wireless communication channel 125 can be used to allow the remote device 140, and other remote devices, to access the broadband/cellular network 108 via the router 130, the wireless broadband access device 102 and the bi-directional wireless communication channel 106.

Figure 2:
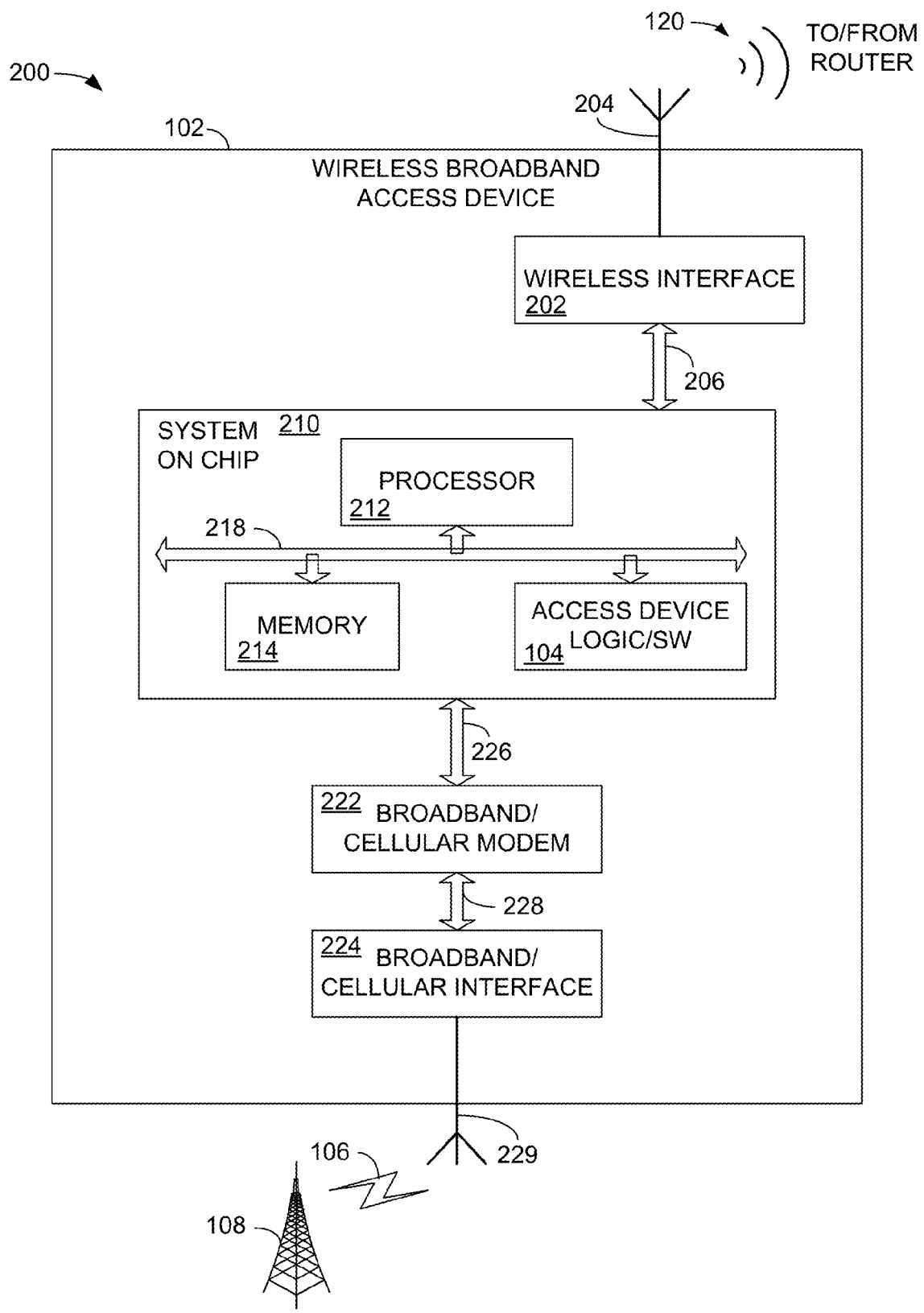
FIG. 2 is a block diagram illustrating an embodiment of a wireless broadband access device in greater detail.

FIG. 2 is a block diagram 200 illustrating an embodiment of the wireless broadband access device 102 in greater detail. In an exemplary embodiment, the wireless broadband access device 102 comprises a system-on-chip 210, a wireless interface 202, a broadband/cellular modem 222 and a broadband cellular interface 224. The term "system-on-chip" is intended to broadly define a processing system, operating system, or other hardware, software, firmware, or any combination thereof, that can be used to execute the functionality of the wireless broadband access device 102 described herein.

The system-on-chip 210 may comprise a processor 212, which can be a general purpose or special purpose microprocessor, a memory 214 and access device logic/software 104, coupled over a system bus 218. The system bus 218 can comprise the physical and logical connections to couple the above-described elements together and enable their interoperability. Although described in a system-on-chip implementation, the wireless broadband access device 102, the access device logic/software 104, and the other elements described herein as being associated with the wireless broadband access device 102 may be implemented using other embedded or non-embedded exemplary embodiments. For example, the wireless broadband access device 102 and the access device logic/software 104 may be implemented as one or more of hardware, software, firmware, or any combination thereof on a processing system, such as a processing system running on a personal computer, or other computing device. In an exemplary embodiment, the wireless broadband access device 102 and the access device logic/software 104 may be implemented as part of an operating system, such as, for example only, a Linux operating system, or other systems.

The memory 214 can be any type of volatile or non-volatile memory, and in an embodiment, can include flash memory. The memory 214 can be permanently installed in the wireless broadband access device 102, or can be a removable memory element, such as a removable memory card.

The processor 212 can be any processor that executes the access device logic/software 104 to control the operation and functionality of the wireless broadband access device 102. In an exemplary embodiment, some or all of the access device logic/software 104 may reside in the memory 214. Alternatively, portions of the access device logic/software 104 may reside outside of the wireless broadband access device 102, such as on a removable memory element (not shown).

The wireless interface 202 may be operatively coupled to the system-on-chip 210 over a bus connection 206. The wireless interface 202 may also be coupled to an antenna 204 to access the wireless network 120. The bus connection 206 may be an independent connection, or may be part of the system bus 218.

The broadband/cellular modem 222 may be operatively coupled to the system-on-chip 210 over a bus connection 226, and to the broadband/cellular interface 224 over a bus connection 228. The broadband/cellular interface 224 may be coupled to an antenna 229 to establish the bi-directional wireless communication channel 106 with the broadband/cellular network 108. The bus connection 226 and the bus connection 228 may be independent connections, or may be part of the system bus 218.

Moreover, although shown as separate elements, the wireless interface 202, the broadband/cellular modem 222, and the broadband/cellular interface 224 may be part of, contained in, or otherwise associated with or into the system-on-chip 210.

While shown in an exemplary embodiment as a single element physically residing within the wireless broadband access device 102, the access device logic/software 104 may comprise one or more disparate elements or components, part or all of which may reside outside of the wireless broadband access device 102, and be accessible by the wireless broadband access device 102 over, for example, one or more networks, such as the wireless network 120 or the broadband/cellular network 108.

Figure 3:
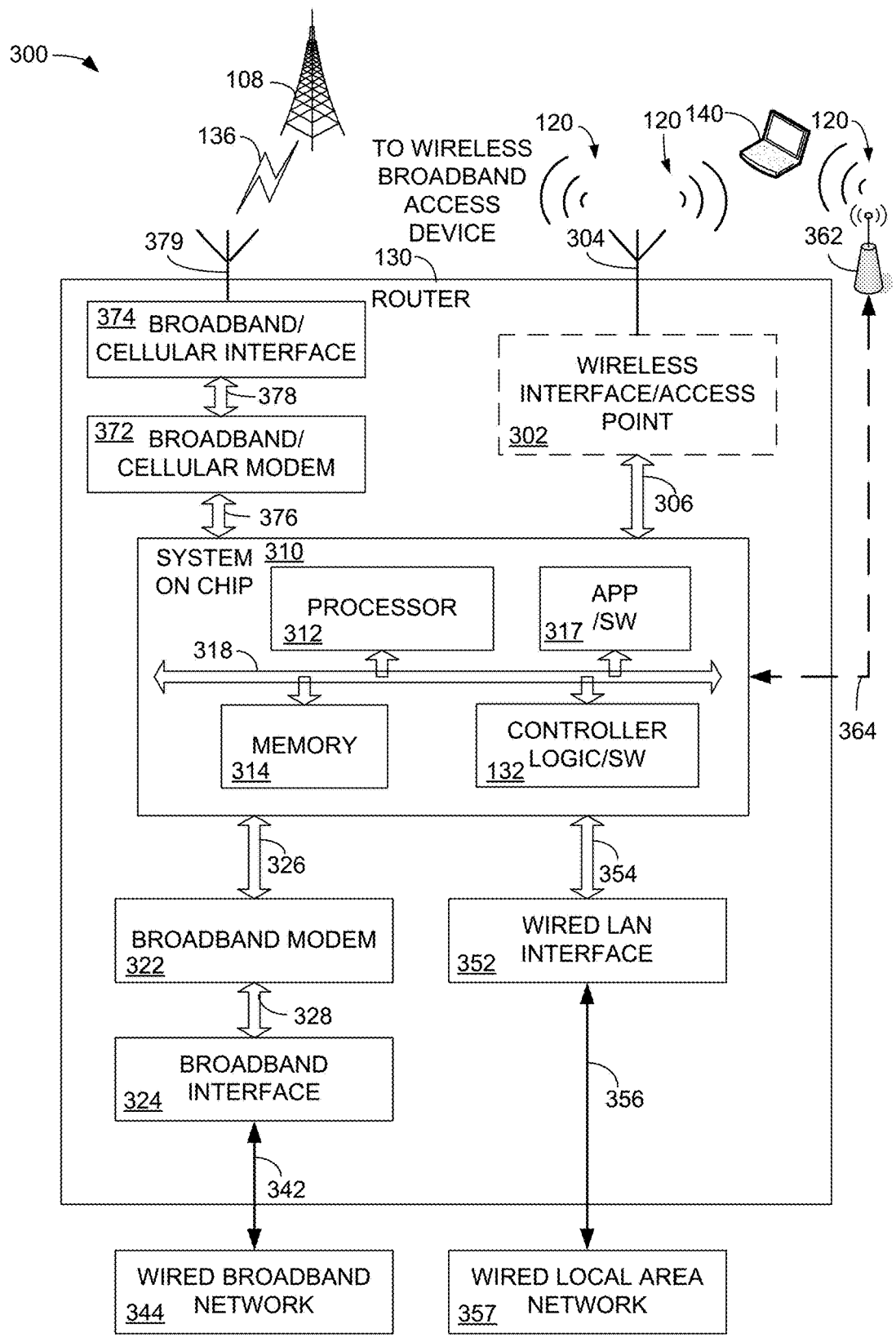
FIG. 3 is a block diagram illustrating an embodiment of a router in greater detail.

FIG. 3 is a block diagram 300 illustrating an embodiment of the router 130 in greater detail. In an exemplary embodiment, the router 130 comprises a system-on-chip 310, a wireless interface/access point 302, a broadband modem 322, a broadband interface 324 a wired LAN interface 352, a broadband/cellular modem 372, and a broadband/cellular interface 374.

The system-on-chip 310 may comprise a processor 312, which can be a general purpose or special purpose microprocessor, a memory 314, controller logic/software 132, and application software 317 coupled over a system bus 318. The system bus 318 can comprise the physical and logical connections to couple the above-described elements together and enable their interoperability.

The memory 314 can be any type of volatile or non-volatile memory, and in an embodiment, can include flash memory. The memory 314 can be permanently installed in the router 130, or can be a removable memory element, such as a removable memory card.

The processor 312 can be any processor that executes the application software 317 to control the general operation of the router 130, and executes the controller logic/software 132 to control the operation and functionality of the router 130 as it pertains to communication with the wireless broadband access device 102 (FIG. 1 and FIG. 2). In an exemplary embodiment, some or all of the application software 317 and controller logic/software 132 may reside in the memory 314. Alternatively, portions of the controller logic/software 132 may reside outside of the router 130, such as on a removable memory element (not shown).

The wireless interface/access point 302 may be operatively coupled to the system-on-chip 310 over a bus connection 306. The wireless interface/access point 302 may also be coupled to an antenna 304 to access the wireless network 120. The bus connection 306 may be an independent connection, or may be part of the system bus 318.

The broadband modem 322 may be operatively coupled to the system-on-chip 310 over a bus connection 326 and to the broadband interface 324 over a bus connection 328. The broadband interface 324 may be coupled to a wired broadband network 344 over a connection 342 to establish a bi-directional wired communication channel with the wired broadband network 344. The bus connection 326 and the bus connection 328 may be independent connections, or may be part of the system bus 318.

The wired LAN interface 352 may be operatively coupled to the system-on-chip 310 over a bus connection 354. The wired LAN interface 352 may be coupled to a wired local area network 357 over a connection 356 to establish a bi-directional wired communication channel with the wired local area network 357. The bus connection 354 may be an independent connection, or may be part of the system bus 318.

In an alternative exemplary embodiment in which the router 130 may not contain a wireless interface/access point 302, the system 300 may include an external wireless access point (WAP) 362 coupled to the system-on-chip 310 over connection 364 so that the router 130 may access the wireless network 120. The connection 364 is shown as a dotted line to signify that it represents an alternative wireless connection to couple the router 130 to the wireless network 120.

The broadband/cellular modem 372 may be operatively coupled to the system-on-chip 310 over a bus connection 376, and to the broadband/cellular interface 374 over a bus connection 378. The broadband/cellular interface 374 may be coupled to an antenna 379 to establish the bi-directional wireless communication channel 136 with the broadband/cellular network 108. The bus connection 376 and the bus connection 378 may be independent connections, or may be part of the system bus 318.

Moreover, although shown as separate elements, the wireless interface/access point 302, the broadband modem 322, the broadband interface 324, the wired LAN interface 352, the broadband/cellular modem 372 and the broadband/cellular interface 374 may be part of, contained in, or otherwise associated with or into the system-on-chip 310.

While shown in an exemplary embodiment as a single element physically residing within the router 130, the controller logic/software 132 may comprise one or more disparate elements or components, part or all of which may reside outside of the router 130, and be accessible by the router 130 over, for example, one or more networks, such as the wireless network 120, the wired broadband network 344, and/or the wired local area network 357.

Figure 4A:
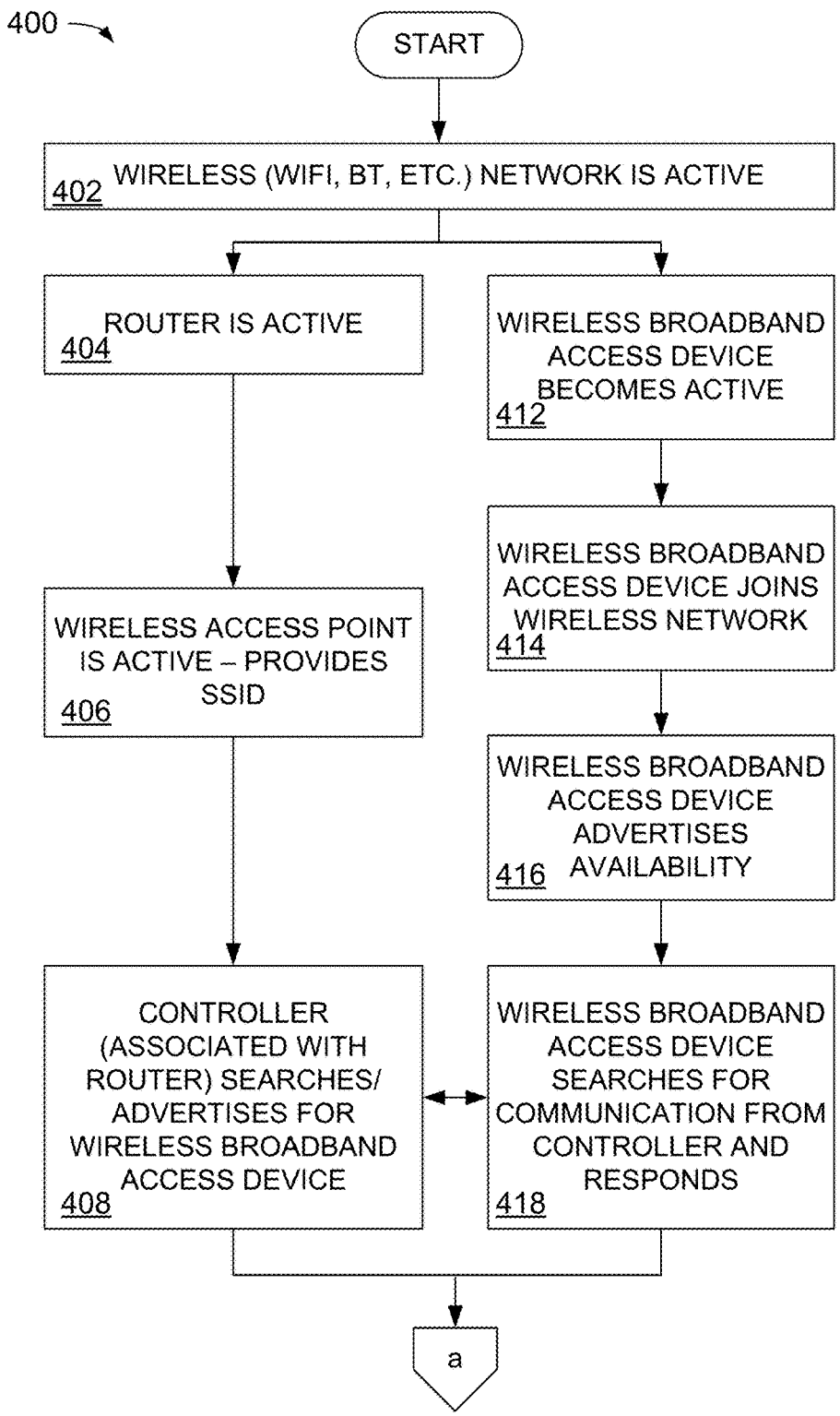
FIG. 4A and FIG. 4B collectively illustrate a flowchart illustrating an exemplary embodiment of a method for accessing broadband connectivity over a local wireless network.
Figure 4B:
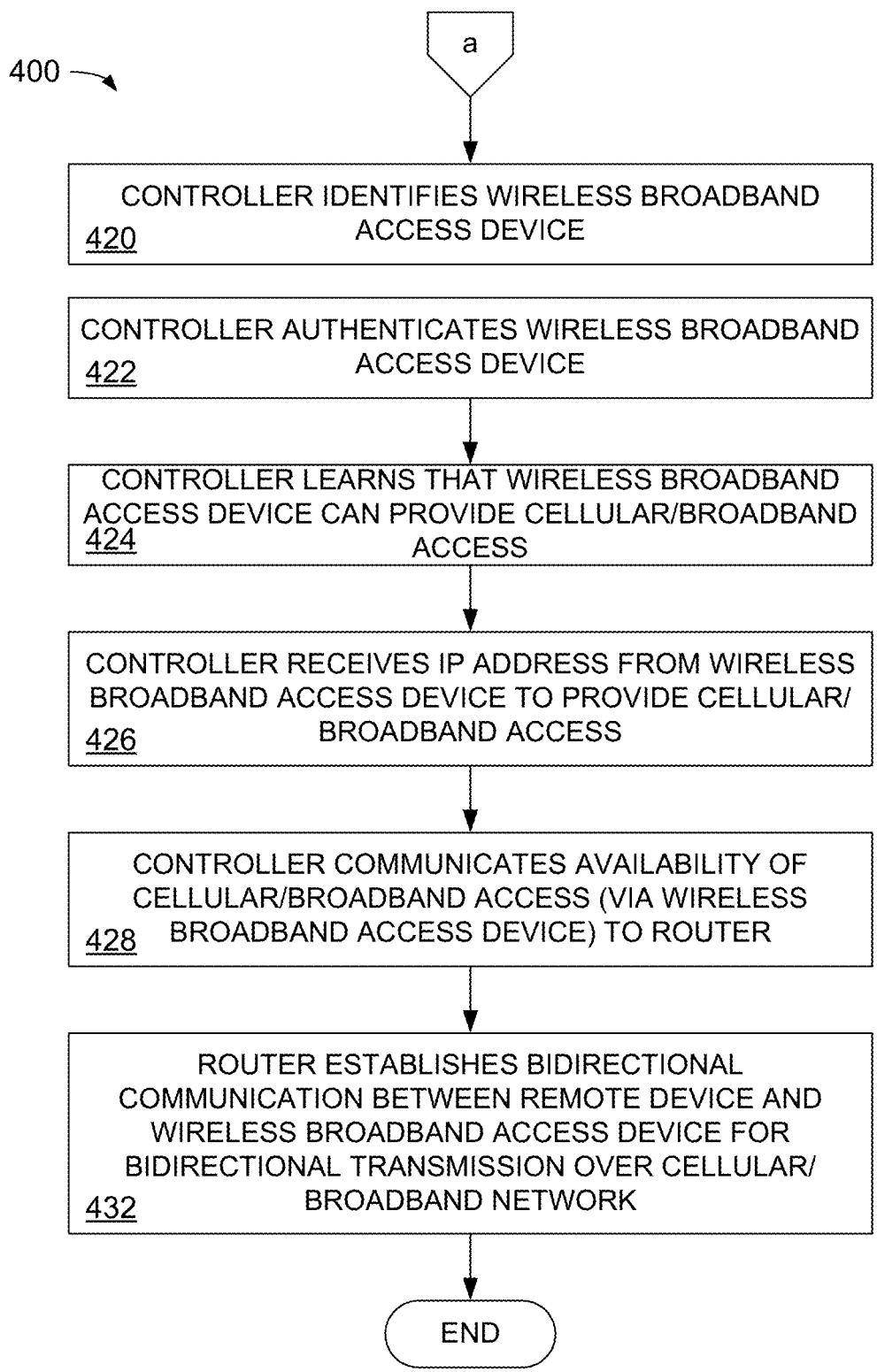

FIG. 4A and FIG. 4B collectively illustrate a flowchart showing an exemplary embodiment of a method 400 for accessing broadband connectivity over a local wireless network. The steps in the method 400 can be performed in or out of the order shown, and one or more of the steps the method 400 can be performed in parallel. The description of the method 400 will relate to the embodiment of the communication system 100 shown in FIG. 1 for convenience of description only. The method 400 applies to other embodiments of a communication system having more or fewer of the components described in FIG. 1 as well.

In block 402, the wireless network 120 is active and able to allow wireless communication between and among the wireless broadband access device 102, the router 130, the wireless access point 134 and the remote device 140.

In block 404, the router 130 becomes active and, if equipped with a wireless access capability, becomes wirelessly coupled to the wireless network 120.

In block 406, the wireless access point 134 becomes active and wirelessly couples to the wireless network 120 and to the router 130. Depending on whether the router 130 has built-in wireless network access capability, the steps 404 and 406 may be combined into a single step.

In block 408, the controller logic/software 132 causes the router 130 to search for and advertise its presence to the wireless broadband access device 102. This may occur by one or more of the router 130 and/or the wireless access point 134 broadcasting a discovery message over the wireless network 120. A discovery message sent over the wireless network 120 may comprise a protocol understood by the controller logic/software 132, the router 130, the wireless broadband access device 102, and the access device logic 104 to allow the wireless broadband access device 102 to be aware of the presence of the router 130 on the wireless network 120. In an exemplary embodiment, the steps 404, 406 and 408 are generally performed serially in the order shown.

In block 412, the wireless broadband access device 102 becomes active, and in block 414, the wireless broadband access device 102 joins the wireless network 120. For example, the wireless broadband access device 102 may use one or more pre-configured settings to detect and connect to the wireless network 120. Exemplary embodiments of these one or more pre-configured settings to detect and connect to the wireless network 120 include, for example, various wireless connectivity options such as credentials for WPA2 Pre-Shared Key, 802.1x, and other present or future wireless authentication protocols, which may be set on the wireless broadband access device 102 via configuration files, which may also be interactively configured by a user directly on the wireless broadband access device 102 or preprogrammed during manufacturing.

In block 416, the wireless broadband access device 102 advertises its availability on the wireless network 120.

In block 418, the wireless broadband access device 102 searches for a communication from the controller logic/software 132 and/or the router 130 (such as the discovery message broadcast in step 408). For example, the controller logic/software 132 may cause the router 130 to periodically broadcast discovery messages on the wireless network 120 requesting a response from a wireless broadband access device 102. When the wireless broadband access device 102 recognizes a discovery message from the router 130, the wireless broadband access device 102 responds to the router 130 with an acknowledgement message alerting the router 130 that it is an instance of the wireless broadband access device 102. This is shown in FIG. 4A as the bi-directional arrow between the step 408 and the step 418. The term "instance" is used to describe a wireless broadband access device 102 that may be one of two or more wireless broadband access devices 102. For example, controller logic/software 132 may cause the router 130 to communicate with one or more wireless broadband access devices 102 such as, for example, to determine which of the wireless broadband access devices 102 has the best signal characteristics and use that wireless broadband access device 102 to establish the wireless communication channel 125 as the route to the broadband/cellular network 108.

In an exemplary embodiment, the steps 412, 414, 416 and 418 are generally performed serially in the order shown. Moreover, the steps 404, 406 and 408 may be performed generally in parallel with the steps 412, 414, 416 and 418, as shown.

In block 420, the controller logic/software 132 identifies the wireless broadband access device 102 using, for example, various information such as, but not limited to, an Internet Protocol (IP) address, and/or a data link layer (layer 2 of the OSI (open systems interconnect) 7 layer model) address in the response that the wireless broadband access device 102 sent to the router 130 in block 418.

In block 422, the controller logic/software 132 authenticates the wireless broadband access device 102. The controller logic/software 132 may use one of a number of different protocols to authenticate the wireless broadband access device 102. Exemplary embodiments of such a protocol may include 802.1x, a pre-configured data link layer (layer 2 of the OSI (open systems interconnect) 7 layer model) address for the wireless broadband access device 102, configured in the controller logic/software 132, or another standard or specific authentication methodology. Any of these exemplary embodiments may use information from or may use additional messages exchanged between the access device logic/software 104 and the controller logic/software 132 in addition to that previously described in block 408 and block 418. The controller logic/software 132 authenticating the wireless broadband access device 102 allows the establishment of a secure, or encrypted, bi-directional wireless communication channel between the wireless broadband access device 102 and the router 130.

In block 424, the controller logic/software 132 receives notification from the wireless broadband access device 102 that the wireless broadband access device 102 can provide access to a broadband/cellular network 108.

In block 426, the controller logic/software 132 receives an identifier, such as an Internet Protocol (IP) address from the wireless broadband access device 102, so that the router 130 may be identifiable on the broadband/cellular network 108.

In block 428 the controller logic/software 132 communicates the availability of the broadband/cellular network 108 to the router 130.

In block 432, the router 130 establishes a bi-directional wireless communication channel between the remote device 140 and the wireless broadband access device 102 using the wireless network 120 to allow bi-directional wireless communication access to the broadband/cellular network 108 using the wireless communication channel 125. The determination of when to use the wireless communication channel 125 to access the broadband/cellular network 108 may be made by, for example, a routing policy configuration on the router 130 to determine when the router 130 uses the wireless communication channel 125. For example, the router 130 may be configured to use the wireless communication channel 125 as a primary, or default, communication channel, or as a backup to another wired connection.

In an exemplary embodiment, the controller logic/software 132 in the router 130 may periodically determine if the wireless broadband access device 102 remains available on the wireless network 120, and thus able to act as the path for broadband access. The router 130 periodically sends a message to the wireless broadband access device 102 for this purpose. An example of such a message may be a proprietary specific "discovery" protocol. Another example, if the wireless broadband access device 102 has L3 capability, is using an IP address obtained via dynamic host configuration protocol (DHCP) when the wireless broadband access device 102 joins the wireless network 120, communicating that IP address to the router 130, and the router 130 periodically sending Internet Control Message Protocol (ICMP) pings to the wireless broadband access device 102 to verify its continued presence and availability to provide the wireless communication channel 125 to the broadband/cellular network 108.

FIG. 5 is a call flow diagram 500 illustrating the communication between and among the elements of FIG. 1. When discussing actions of the router 130, it is assumed that the controller logic/software 132 is also engaged in causing the router 130 to take the particular action discussed. As mentioned herein, the controller logic/software 132 may be located at least partially within the router 130, or may be located remote from the router 130. Similarly, when discussing actions of the wireless broadband access device 102, it is assumed that the access device logic/software 104 is also engaged in causing the wireless broadband access device 102 to take the particular action discussed.

The diagram 500 illustrates the operation of various elements in FIG. 1 for reference and assumes that the wireless broadband access device 102 and the router 130 are connected to the wireless network 120.

The call 510 represents the router 130 (and the controller logic/software 132) searching and/or advertising for a wireless broadband access device 102 using, for example, one of the discovery protocols mentioned herein.

The call 512 represents the wireless broadband access device 102 joining the wireless network 120 and responding to the discovery call 510 sent by the controller logic/software 132.

The call 514 represents the wireless broadband access device 102 advertising its availability to the controller logic/software 132, which the controller logic/software 132 operating on the router 130 may respond to or which it may ignore, depending on the configuration of the router 130 and the controller logic/software 132. For example, the router 130 and the controller logic/software 132 may be configured to respond only when the wireless broadband access device 102 sends an acknowledgement to a discovery message as described in block 418. Alternatively, the router 130 and the controller logic/software 132 may be configured to ignore unsolicited messages from the wireless broadband access device 102.

The call 516 represents the controller logic/software 132 authenticating the wireless broadband access device 102, which may use either uni-directional or bi-directional communication between the router 130 and the wireless broadband access device 102.

The call 518 represents the wireless broadband access device 102 sending its capability and ability to access the broadband/cellular network 108 and an identifier, such as an IP address, to the controller logic/software 132.

The call 522 represents the controller logic/software 132 sending the availability and capability of the wireless broadband access device 102 to the router 130.

The call 524 represents bi-directional data being sent between the router 130 and the remote device 140.

The call 526 represents bi-directional data being sent between the router 130 and the wireless broadband access device 102 using the wireless communication channel 125.

The call 528 represents bi-directional data being communicated from the wireless broadband access device 102 over the broadband/cellular network 108. In this manner, the remote device 140 can communicate bi-directionally over the cellular/broadband network 108 using the wireless communication channel 125 established as described herein between the router 130 and the wireless broadband access device 102.

Figure 6:
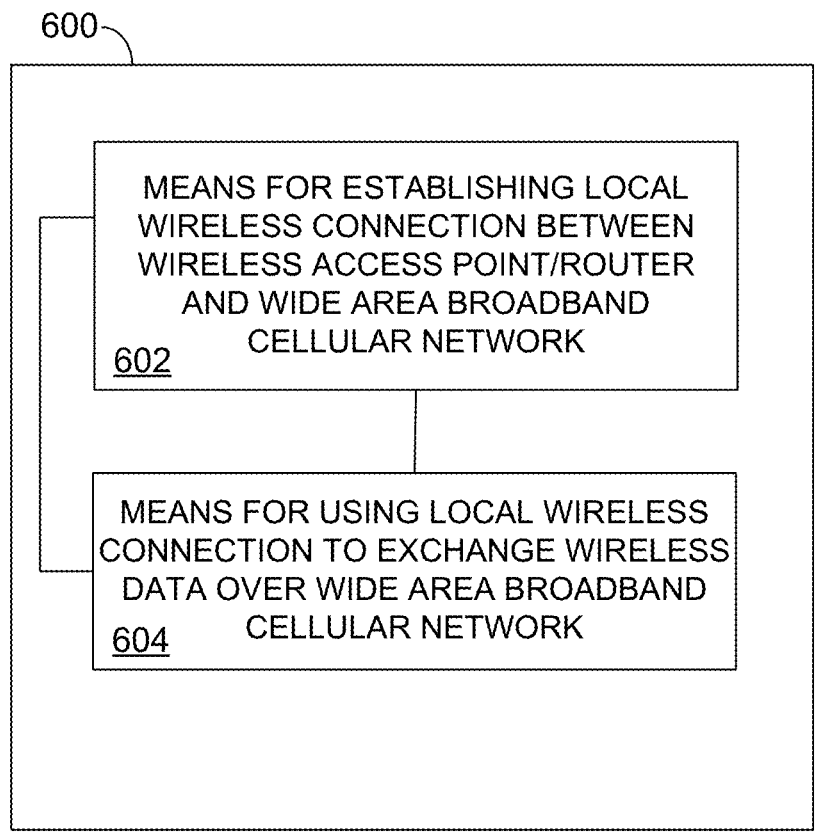
FIG. 6 is a functional block diagram of an apparatus for accessing broadband connectivity over a local wireless network.

FIG. 6 is a functional block diagram of an apparatus 600 for accessing broadband connectivity over a local wireless network. The apparatus 600 comprises means 602 for establishing a local wireless connection between a router or wireless access point and a wide area broadband/cellular network. In certain embodiments, the means 602 for establishing a local wireless connection between a router or wireless access point and a wide area broadband/cellular network can be configured to perform one or more of the functions described in the method 400 (FIG. 4A and FIG. 4B). In an exemplary embodiment, the means 602 for establishing a local wireless connection between a router or wireless access point and a wide area broadband/cellular network may comprise establishing a wireless communication channel 125 as described herein.

The apparatus 600 further comprises means 604 for using a local wireless connection to exchange data wirelessly over a wide area broadband/cellular communication network. In certain embodiments, the means 604 for using a local wireless connection to exchange data wirelessly over a wide area broadband/cellular communication network can be configured to perform one or more of the functions described in operation block 432 of method 400 (FIG. 4B). In an exemplary embodiment, the means 604 for using a local wireless connection to exchange data wirelessly over a wide area broadband/cellular communication network may comprise using the wireless communication channel 125 established as described herein between the router 130 and the wireless broadband access device 102 to bi-directionally exchange data between the remote device 140 and the broadband/cellular network 108.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

While exemplary embodiments of a system and method for providing broadband access over a local wireless network have been described, those having ordinary skill in the art will recognize that other commonly known and used elements, components and structures have been excluded from the figures and discussion for clarity purposes since those elements do not contribute to the novelty of the exemplary embodiments of the system and method described herein. Moreover, while exemplary embodiments of a system and method for providing broadband access over a local wireless network have been described, it will be apparent to those of ordinary skill in the art that many more embodiments and implementations are possible that are within the scope of the exemplary embodiments of the system and method described herein.

What is claimed is:

1. A system for broadband communication over a local wireless communication channel, comprising:
    a local area network (LAN) router configured to wirelessly access a wireless LAN, the LAN router including controller logic configured to periodically send a discovery message; and
    a wireless broadband access device having wireless access to a wireless broadband communication network, the wireless broadband access device located to optimize a connection to the wireless broadband communication network, the discovery message advertising for the wireless broadband access device, and the wireless broadband access device configured to respond to the discovery message with an acknowledgement message to the LAN router acknowledging the presence of the wireless broadband access device to the controller logic of the LAN router, the wireless broadband access device configured to, based on receipt of the acknowledgement message by the LAN router, wirelessly access the wireless LAN and establish a bi-directional wireless communication channel between the wireless broadband communication network and the LAN router using the LAN.

2. The system of claim 1, wherein a remote device coupled to the LAN router can use the bi-directional wireless communication channel to bi-directionally access the wireless broadband communication network.

3. The system of claim 1, wherein the controller logic is configured to authenticate the wireless broadband access device to establish the bi-directional wireless communication channel between the wireless broadband access device and the LAN router.

4. The system of claim 3, wherein the bi-directional wireless communication channel between the wireless broadband access device and the LAN router is a secure wireless connection.

5. A method for communication, comprising:
    establishing a local wireless communication channel on a wireless local area network (LAN) between a LAN router and a wireless broadband access device, the wireless broadband access device located to optimize a connection to a wireless broadband communication network, wherein establishing the local wireless communication channel includes the LAN router periodically sending a discovery message advertising for the wireless broadband access device, and the wireless broadband access device responding to the discovery message with an acknowledgement message to the LAN router acknowledging the presence of the wireless broadband access device; and
    using the local wireless communication channel to access the wireless broadband communication network to provide a bi-directional wireless communication channel between the wireless broadband communication network and the LAN router.

6. The method of claim 5, wherein a remote device wirelessly coupled to the LAN router can use the bi-directional wireless communication channel to bi-directionally access the wireless broadband communication network.

7. The method of claim 5, further comprising authenticating the wireless broadband access device to establish the bi-directional wireless communication channel between the wireless broadband access device and the LAN router.

8. The method of claim 7, wherein the bi-directional wireless communication channel between the wireless broadband access device and the LAN router is a secure wireless connection.

9. A device, comprising:
    means for establishing a local wireless communication channel between a local area network (LAN) router and a wireless broadband access device, the wireless broadband access device located to optimize a connection to a wireless broadband communication network, wherein the means for establishing the local wireless communication channel includes means for periodically sending, by the LAN router, a discovery message advertising for the wireless broadband access device, and means for responding to the discovery message, by the wireless broadband access device, with an acknowledgement message to the LAN router acknowledging the presence of the wireless broadband access device; and
    means for using the local wireless communication channel to access the wireless broadband communication network to provide a bi-directional wireless communication channel between the wireless broadband communication network and the LAN router.

10. The device of claim 9, further comprising
    means for wirelessly coupling a remote device to the LAN router; and
    means for allowing the remote device to bi-directionally access the wireless broadband communication network.

11. The device of claim 9, further comprising means for authenticating the wireless broadband access device to establish the bi-directional wireless communication channel between the wireless broadband access device and the LAN router.

* * * * *